United States Patent
Kim et al.

(10) Patent No.: US 9,287,549 B2
(45) Date of Patent: Mar. 15, 2016

(54) RECHARGEABLE BATTERY

(75) Inventors: Duk-Jung Kim, Yongin-si (KR); Jae-Ik Kwon, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 35 days.

(21) Appl. No.: 13/484,687

(22) Filed: May 31, 2012

(65) Prior Publication Data

US 2013/0089760 A1    Apr. 11, 2013

(30) Foreign Application Priority Data

Oct. 5, 2011    (KR) .......................... 10-2011-0101286

(51) Int. Cl.
 *H01M 10/42* (2006.01)
 *H01M 2/30* (2006.01)
 *H01M 2/34* (2006.01)

(52) U.S. Cl.
 CPC ........... *H01M 2/30* (2013.01); *H01M 2/34* (2013.01); *H01M 2200/103* (2013.01)

(58) Field of Classification Search
 CPC ... H01M 2/04; H01M 2/0404; H01M 2/0469; H01M 2/06; H01M 10/02; H01M 10/0585; H01M 10/0587; H01M 2200/103
 See application file for complete search history.

(56) References Cited

U.S. PATENT DOCUMENTS

| | | | |
|---|---|---|---|
| 5,348,815 A * | 9/1994 | Barker ............................ | 429/65 |
| 2003/0180582 A1 * | 9/2003 | Masumoto et al. ............... | 429/7 |
| 2004/0018417 A1 | 1/2004 | Stack | |
| 2006/0051664 A1 * | 3/2006 | Tasai et al. .................... | 429/161 |
| 2009/0087693 A1 * | 4/2009 | Kim et al. ......................... | 429/8 |
| 2011/0244317 A1 * | 10/2011 | Lee et al. ...................... | 429/182 |
| 2012/0148910 A1 * | 6/2012 | Kambayashi et al. ........ | 429/179 |

FOREIGN PATENT DOCUMENTS

| | | |
|---|---|---|
| EP | 1 422 771 A1 | 5/2004 |
| EP | 2 360 754 A2 | 8/2011 |
| JP | 08-315802 A | 11/1996 |
| JP | 09-153352 A | 6/1997 |
| JP | 2004-199991 A | 7/2004 |
| JP | 2008-159351 A | 7/2008 |
| JP | 2011-165611 A | 8/2011 |
| KR | 10-0855583 B1 | 8/2008 |

OTHER PUBLICATIONS

English machine translation of JP 2009-289602, Onoda et al., Dec. 2009.*
Extended European Search Report dated Sep. 28, 2012 for EP 12178554.7. (Kim, et al.).

* cited by examiner

*Primary Examiner* — Ula C Ruddock
*Assistant Examiner* — Lisa S Park
(74) *Attorney, Agent, or Firm* — Lee & Morse, P.C.

(57) ABSTRACT

A rechargeable battery includes an electrode assembly charging and discharging a current, a case in which the electrode assembly is installed, a cap plate coupled to an opening of the case, an electrode terminal provided on the cap plate, and an external insulator receiving the electrode terminal from the outside of the cap plate. The electrode terminal includes a first plate terminal electrically connected to the electrode assembly, a second plate terminal separated from the first plate terminal, and a fuse portion connecting the first plate terminal and the second plate terminal.

20 Claims, 11 Drawing Sheets

RECHARGEABLE BATTERY

BACKGROUND

1. Field

Embodiments relate generally to a rechargeable battery having a fuse unit on an external side thereof.

2. Description of the Related Art

A rechargeable battery is a battery that can be repeatedly charged and discharged, unlike a primary battery. A small sized rechargeable battery is used as a power supply for small electronic devices such as cellular phones, notebook computers, and camcorders, while a medium or large sized rechargeable battery is used as a power supply for driving motors in hybrid vehicles and the like.

The rechargeable battery includes an electrode assembly around which a positive electrode and a negative electrode are wound, having a separator therebetween, a case having the electrode assembly embedded therein, a cap plate sealing an opening of a case, and an electrode terminal electrically connected to the electrode assembly by penetrating through the cap plate.

In the rechargeable battery, an electrically weak portion in a line connecting the electrode assembly and the electrode terminal may melt and be disconnected when large current is charged or discharged. In order to effectively disconnect the line, the rechargeable battery may further include a fuse portion.

However, after line melts and is disconnected, the fuse portion may cause generation of an arc in the disconnected portion if the disconnection gap is too small. The arc generated in the rechargeable battery may be applied to the electrolyte solution, and may thereby cause explosion or fire. That is, safety of the rechargeable battery may be deteriorated.

The above information disclosed in this Background section is only for enhancement of understanding of the background of the described technology and therefore it may contain information that does not form the prior art that is already known in this country to a person of ordinary skill in the art.

SUMMARY

One or more embodiments provide a rechargeable battery configured to maintain safety even after disconnection of a fuse portion and/or when an arc is generated.

One or more embodiments provide a rechargeable battery having improved design flexibility by including first and second plate terminals that are separated from each other on an external side of a cap plate and are connected using a fuse portion so that safety of the rechargeable battery can be maintained even when an arc is generated after disconnection of the fuse portion.

One or more embodiments provide a rechargeable battery including first and second plate terminals that are supported by an external insulator and a fuse portion that is surrounded by the external insulator so that deterioration of mechanical strength of the fuse portion and scattering of splinters due to the fuse operation can be prevented.

One or more embodiments provide a rechargeable battery, including an electrode assembly configured to charge and discharge current, a case in which the electrode assembly is installed, the case including an opening, a cap plate coupled to the opening of the case, an electrode terminal provided on the cap plate, and an external insulator receiving the electrode terminal from an external side of the cap plate, wherein the electrode terminal includes a first plate terminal electrically connected to the electrode assembly, a second plate terminal separated from the first plate terminal, and a fuse portion connecting the first plate terminal and the second plate terminal.

The electrode terminal may include a rivet terminal connecting the electrode assembly to the first plate terminal.

The external insulator may include a first insulator member configured to support the first plate terminal and the second plate terminal in an insulated manner and surround at least one side the first and second plate terminals, and a second insulator member coupled to the first insulator member and surrounding at least one other side of the first and second plate terminals.

The first insulator member may include a first plate disposed on the cap plate and configured to support the first plate terminal, a second plate separated from the first plate and configured to support the second plate terminal, and a side wall connecting side surfaces of the first and second plates to surround the at least one side of the first and second plate terminals.

The first plate may include a first through-hole corresponding to a through-hole of the first plate terminal, the first through-hole being configured to receive the rivet terminal, and the second plate includes a second through-hole corresponding to a through-hole of the second plate terminal and the first through-hole.

A diameter of the second through-hole may be larger than a diameter of the first through-hole.

The side wall of the first insulator member may include a lower side wall surrounding the first plate terminal and an upper side wall surrounding the second plate terminal.

The lower side wall may include a lower coupling groove slide-ably coupled to a coupling protrusion of a side wall of the second insulator member, arranged opposite to the lower coupling groove.

The upper side wall may include an upper coupling groove slide-ably coupled to a coupling frame of the second plate terminal, arranged opposite to the upper coupling groove.

The second insulator member may include a side wall connected to the side wall of the first insulator member to surround the at least one other side surface of the first and second plates.

The second insulator member may include a snap on an inner side of the side wall so as to be coupled to a snap groove of the first insulator member, arranged opposite to the snap.

The second insulator member may include a slide groove on an inner side of the side wall so as to be slide-ably coupled to a coupling frame of the second plate terminal, arranged opposite to the slide groove.

The fuse portion may protrude downward from the second plate terminal and the fuse portion has a width that is smaller than a width of the second plate terminal, and may be electrically connected to a receiving groove of the first plate terminal.

The fuse portion may be surrounded by the second insulator member and is disposed on an inner side of the side wall.

The electrode terminal may include a bolt provided in a through-hole of the second plate terminal.

A head of the bolt may be supported between the second plate terminal and the second plate that face each other.

A head of the bolt may be supported between the second plate terminal and the first plate terminal.

A head of the bolt may be supported between the second plate terminal and the first insulator member.

One or more embodiments provide a rechargeable battery, including an electrode assembly configured to charge and discharge current, a case in which the electrode assembly is installed, the case including an opening, a cap plate coupled to the opening of the case, an electrode terminal including a first sub-module and a second sub-module, wherein the first sub-module is arranged on a first side of the cap plate, and the second sub-module is arranged on an second side of the cap plate, the first sub-module includes a first plate terminal electrically connected to the electrode assembly, a second plate terminal separated from the first plate terminal, a fuse portion connecting the first plate terminal and the second plate terminal, and an external insulator configured to support and electrically insulate the first plate terminal and the second plate terminal.

The first side may be an external side and the second side may be an internal side of the case.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
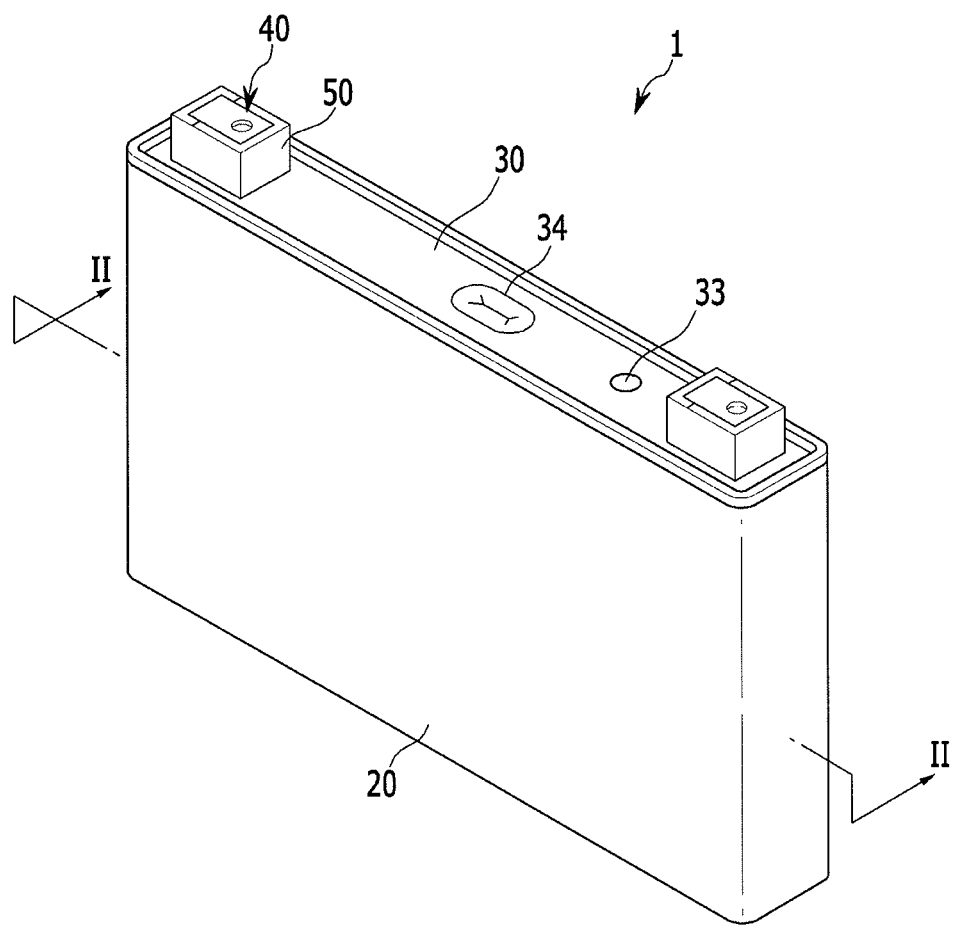
FIG. 1 illustrates a perspective view of a rechargeable battery according to a first exemplary embodiment.

Korean Patent Application No. 10-2011-0101286, filed on Oct. 5, 2011, in the Korean Intellectual Property Office, and entitled: "Rechargeable Battery," is incorporated by reference herein in its entirety.

Exemplary embodiments will be described more fully hereinafter with reference to the accompanying drawings, in which exemplary embodiments are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
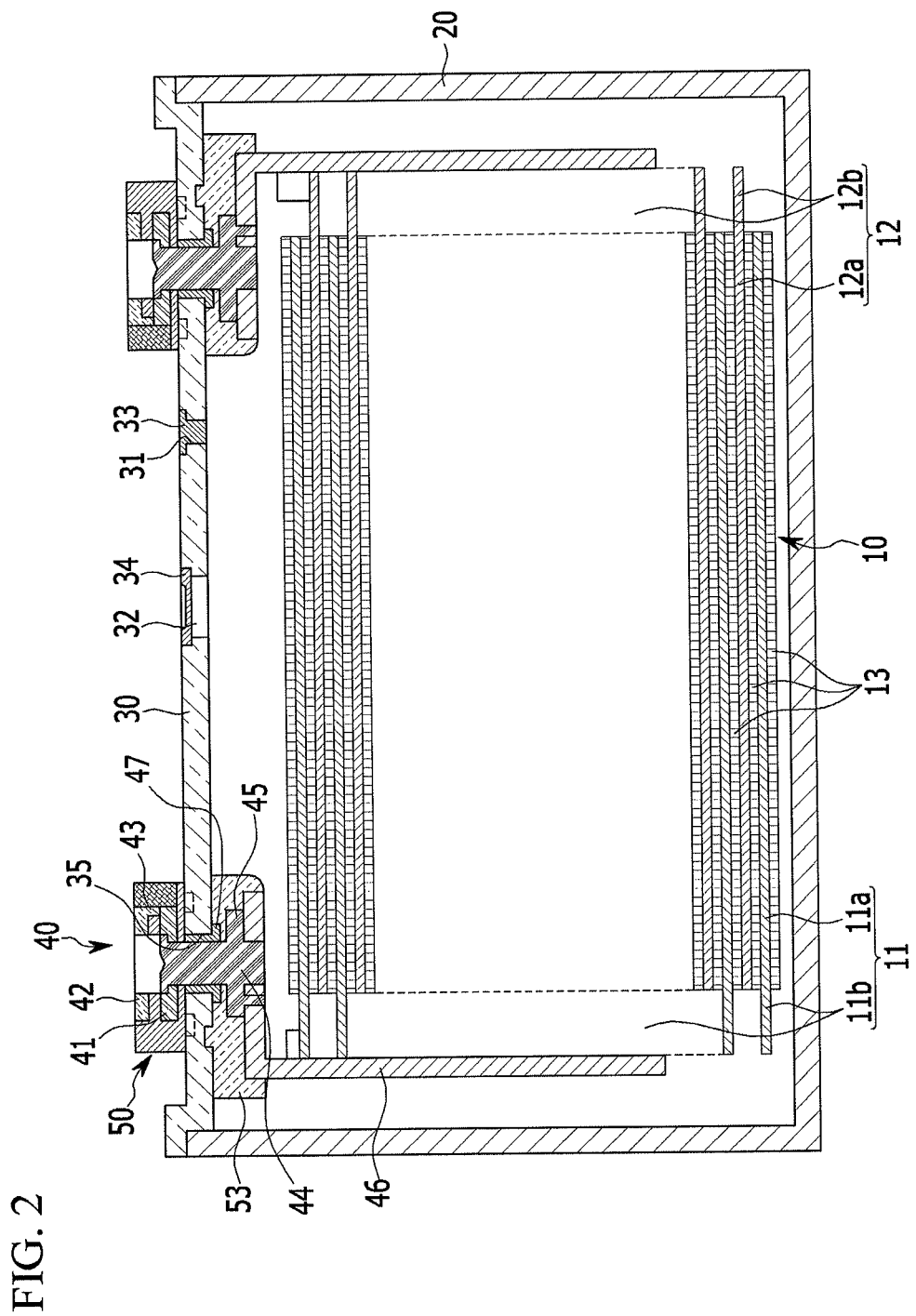
FIG. 2 illustrates a cross-sectional view of FIG. 1, taken along the line II-II.

FIG. 1 illustrates a perspective view of a rechargeable battery 1 according to a first exemplary embodiment and FIG. 2 illustrates a cross-sectional view of the rechargeable battery 1 of FIG. 1, taken along the line II-II.

Referring to FIGS. 1 and 2, the rechargeable battery 1 may include an electrode assembly 10, a case 20, a cap plate 30, an electrode terminal 40, and an external insulator 50. The electrode assembly 10 may be configured to charge and discharge current. The case 20 may house the electrode assembly 10. The cap plate 30 may be coupled to an opening of the case 20. The electrode terminal 40 may be provided in the cap plate 30. The external insulator 50 may be configured to receive the electrode terminal 40 from an outside of the cap plate 30.

For example, the electrode assembly 10 may be formed by disposing a negative electrode 11 and a positive electrode 12 at both sides of a separator 13 and spirally winding the negative electrode 11, the separator 13, and the positive electrode 12 in a jelly roll manner.

Alternatively, the electrode assembly may be assembled by layering a negative electrode and a positive electrode formed of a single plate and interposing a separator therebetween, or may be assembled by folding and layering the negative electrode, the separator, and the positive electrode in a zigzag manner (not shown).

The negative electrode 11 and the positive electrode 12 may respectively include coated regions 11a and 12a where an active material is coated (not shown) on a current collector of each metal plate and uncoated regions 11b and 12b formed of current collectors exposed by not being coated by the active material.

The uncoated region 11b of the negative electrode 11 may be disposed at a first end of the negative electrode 11 along the spirally wound negative electrode 11. The uncoated region 12b of the positive electrode 12 may be disposed at a first end of the positive electrode 12 along the spirally wound positive electrode 12. More particularly, the uncoated regions 11b and 12b may be respectively disposed at both ends of the electrode assembly 10.

In one or more embodiments, the case 20 may be formed in the shape of a cuboid. The case 20 includes a space for receiving the electrode assembly 10 and electrolyte solution. The case 20 may include an opening at one side of thereof, e.g., one side of the cuboid, to connect external and internal elements. The opening enables the electrode assembly 10 to be inserted into the case 20.

The cap plate 30 may be formed of a thin steel plate and may be provided at the opening of the case 20. The cap plate 30 may close and seal the case 20. The cap plate 30 may include an electrolyte injection opening 31 and a vent hole 32. After the case 20 is coupled to the cap plate 30, electrolyte solution may be injected into case 20 via the electrolyte injection opening 31. After injection of the electrolyte solution, the electrolyte injection opening 31 may be sealed by a sealing cap 33.

The vent hole 32 may be closed and sealed by the vent plate 34. The vent hole 32 and vent plate 34 may enable release of an internal pressure of the rechargeable battery. More particularly, e.g., when the internal pressure of the rechargeable battery reaches a predetermined pressure level, the vent plate 34 may rupture and the vent hole 32 may be opened.

The electrode terminal 40 may include a negative electrode terminal and a positive electrode terminal that penetrate the cap plate 30 and are electrically connected to the electrode assembly 10. The negative electrode terminal is electrically connected to the negative electrode 11 of the electrode assembly 10 and the positive electrode terminal is electrically connected to the positive electrode 12 of the electrode assembly 10. Thus, the electrode assembly 10 is drawn out to the outside of the case through the negative and positive electrode terminals, that is, the electrode terminals. Further, the negative electrode terminal and the positive electrode terminal have the same structure, and therefore they will be described as the electrode terminal 40.

More particularly, the electrode terminal 40 may include a first plate terminal 41, a second plate terminal 42 separated from the first plate terminal 41, and a fuse portion 43 connecting the first plate terminal 41 and the second plate terminal 42 with each other. The electrode terminal 40 may further include a rivet terminal 44. The rivet terminal 44 may connect the electrode assembly 10 and the first plate terminal 41 with each other.

Figure 3:
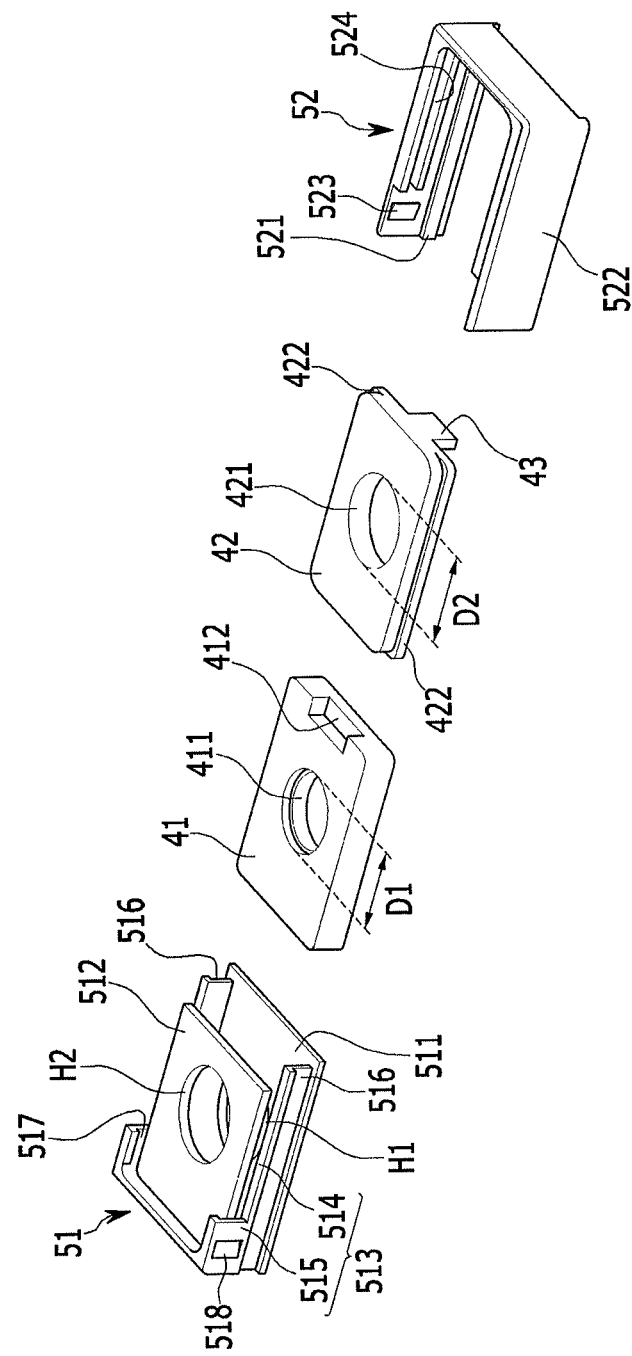
FIG. 3 illustrates an exploded perspective view of an exemplary embodiment of an external insulator, a first plate terminal, and a second plate terminal.
Figure 4A:
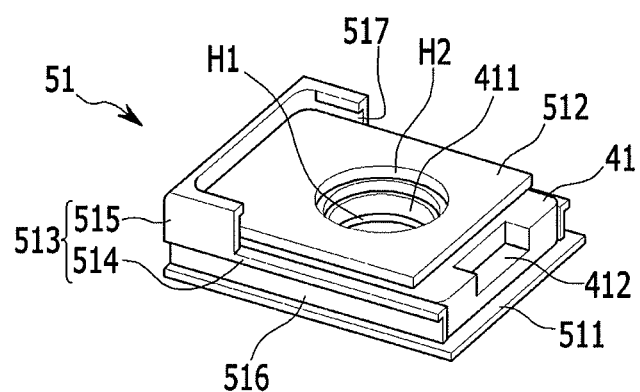
FIGS. 4A, 4B, and 4C illustrate an assembly flowchart of the external insulator, the first plate terminal, and the second plate terminal of FIG. 3.
Figure 4B:
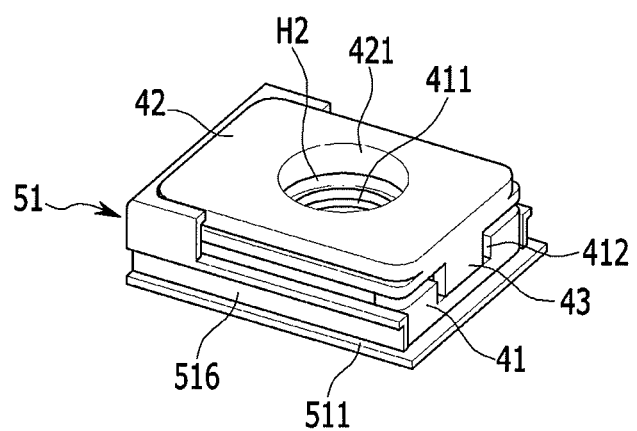
Figure 4C:
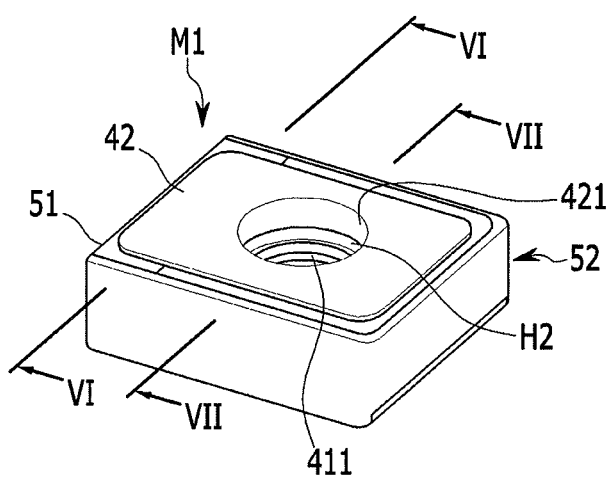

FIG. 3 illustrates an exploded perspective view of the external insulator 50, the first plate terminal 41, and the second plate terminal 42, and FIGS. 4A, 4B, and 4C illustrate an assembly flowchart of the external insulator 50 and the first and second plate terminals 41, 42.

Referring to FIGS. 2 to 4, the external insulator 50 may include a first insulator member 51 and a second insulator member 52. The first insulator member 51 and the second insulator member 52 may partially receive the electrode terminal 40 and be coupled to each other to fix the electrode terminal 40 on the cap plate 30 in an electrically insulated manner.

The first insulator member 51 may separate and electrically insulate the first plate terminal 41 and the second plate terminal 42, and may support and surround parts of the first and second plate terminals 41 and 42. The second insulator member 52 may be coupled to the first insulator member 51 and may surround portions or sides of the first and second plate terminals 41 and 42, e.g., one or more portions or sides not surrounded by the first insulator member 51, for electric insulation and support. Portions of the first plate terminal 41 and the second plate terminal 42 may be surrounded by one or both of the first insulator member 51 and/or the second insulator member 52.

Figure 5:
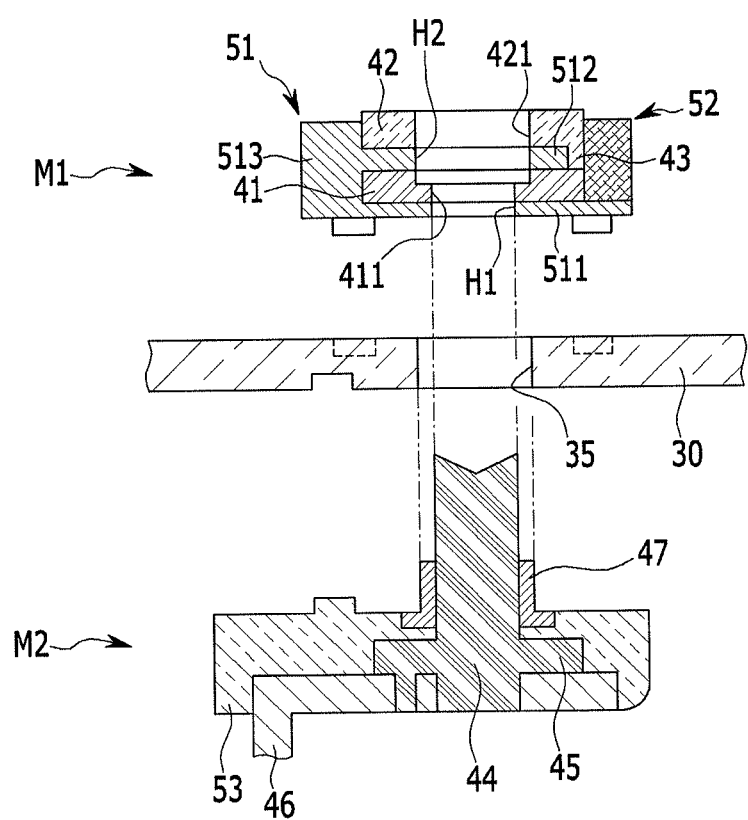
FIG. 5 illustrates a state of assembling an electrode terminal in a sub-module state to a cap plate.

FIG. 5 illustrates a cross sectional assembly diagram of the electrode terminal 40 in a sub-module state M1, M2 to the cap plate 30. Referring to FIG. 3 to FIG. 5, the first insulator member 51 may include a first plate 511 disposed on the cap plate 30 and supporting the first plate terminal 41, a second plate 512 separated from the first plate 511 and supporting the second plate terminal 42, and a side wall 513 connecting side surfaces of the first and second plates 511, 512. The side wall 513 may separate the first plate terminal 41 and the second plate terminal 42 from each other in a length direction of the rivet terminal 44, and may surround side surfaces of the first and second plate terminals 41, 42.

The first plate 511 may include a first through-hole H1. The first through-hole H1 may correspond to a through-hole 411 of the first plate terminal 41, and may enable riveting of the rivet terminal 44 to the through-hole 411 of the first plate terminal 41 by being penetrated therethrough.

The second plate 512 may form a second through-hole H2. The second through-hole H2 may correspond to a through-hole 421 of the second plate terminal 42. The second through-hole H2 may be at least partially aligned with the first through-hole H1 in an assembled state of the electrode terminal 40. The second through-hole H2 may enable riveting with respect to the first through-hole H1. The second through-hole H2 and the through-hole 421 of the second plate terminal 42 enable treatment of a riveting tool.

More particularly, in one or more embodiments, diameters D2 of the second through-hole H2 of the second plate 512 and the through-hole 421 of the second plate terminal 42 may be larger than diameters D1 of the first through-hole H1 of the first plate 511 and the through-hole 411 of the first plate terminal 41 and, thus, insertion of a riveting tool may be eased. For convenience, FIG. 3 illustrates the diameters D1 and D2 in the through-holes 411 and 421 of the first and second plate terminals 41 and 42.

In addition, the side wall 513 may include a lower side wall 514 surrounding the first plate terminal 41 and an upper side wall 515 surrounding the second plate terminal 42. Referring, e.g., to the exemplary embodiment of FIGS. 3-5, in one or more embodiments, the lower side wall 514 may surround side surfaces of the first plate terminal 41, e.g., the lower side wall 514 may substantially and/or completely surround or overlap three sides along three directions of the first plate terminal 41, and the upper side wall 515 may surround side surfaces of the second plate terminal 42, e.g., the upper side wall 515 may surround one side surface and a part of lateral side surfaces of the surface of the second plate terminal 42.

Referring to FIG. 5, the electrode terminal 40 may include a first sub-module M1 and a second sub-module M2. The first sub-module M1 may be arranged at a first side, e.g., external side, of the cap plate 30, and the second sub-module M2 may be arranged at a second side, e.g., inner side, of the cap plate 30. The first sub-module M1 may include the first and second plate terminal 41 and 42, the fuse portion 43, and the first and second insulator members 51 and 52.

Figure 6:
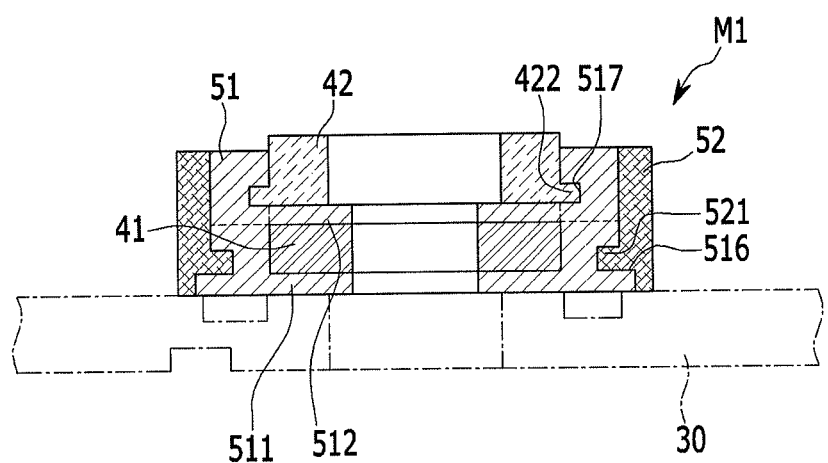
FIG. 6 illustrates a cross-sectional view of FIG. 4C, taken along the line VI-VI.

FIG. 6 illustrates a cross-sectional view of FIG. 4C, taken along the line VI-VI. Referring to FIG. 3 to FIG. 6, the lower side wall 514 may include a coupling protrusion 521 formed in an opposite side wall of the second insulator member 52 and a lower coupling groove 516 slide-ably coupled with the coupling protrusion 521. The upper side wall 515 forms an upper coupling groove 517 slide-ably coupled to a coupling frame 422 of the second plate terminal 42.

The second insulator member 52 includes a side wall 522 that may be connected to the side wall 513 of the first insulator member 51 and may surrounding other side surfaces of the first and second plates 511 and 512 (see FIG. 3).

The second insulator member 52 may include a snap 523 on an inner side of the side wall 522. When the first and second insulator members 51 and 52 are coupled, the snap 523 may couple with a snap groove 518 formed opposite thereto on the first insulator member 51 (see FIG. 3).

As shown in FIGS. 3, 4A, 4B, and 4C, the first plate terminal 41 and the second plate terminal 42 may be sequentially coupled to the first insulator member 51 and the second insulator member 52 may be coupled to the first insulator member 51 such that assembly of the first sub-module M1 shown in FIG. 5 and FIG. 6 may be completed.

Figure 7:
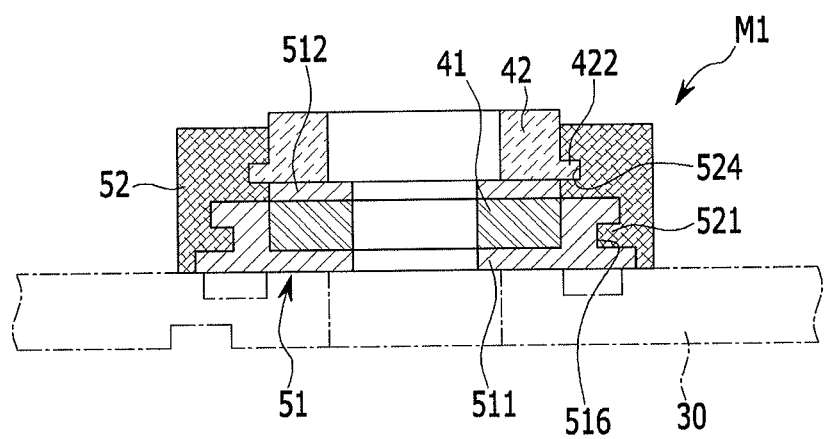
FIG. 7 illustrates a cross-sectional view of FIG. 4, taken along the line VII-VII.

FIG. 7 illustrates a cross-sectional view of FIG. 4C, taken along the line VII-VII. Referring to FIG. 3 to FIG. 7, the second insulator member 52 may include a slide groove 524 on the inner side of the side wall 522 that may be slide-ably coupled to the coupling frame 422 of the second plate terminal 42. The coupling frame 422 may be slide-ably coupled to the upper coupling groove 517 of the first insulator member 51 on one side, and slide-ably coupled to the slide groove 524 of the second insulator member 52 on another other side.

More particularly, the coupling frame 422 of the second plate terminal 42 may be coupled to the upper coupling groove 517 of the first insulator member 51 on one side, and simultaneously, may be coupled to the slide groove 524 of the second insulator member 52 on the other side.

Referring back to FIG. 2 to FIG. 4C, the fuse portion 43 may have a width that is smaller than the width of the second plate terminal 42 and may protrude downward from the second plate terminal 42 such that the fuse portion 43 is electrically connected to a receiving groove 412 of the first plate terminal 41. Thus, the fuse portion 43 has high resistance compared to the first and second plate terminals 41 and 42, and corresponds to an electrically weak portion on charging and discharging lines.

For example, the fuse portion 43 may be coupled to the receiving groove 412 of the first plate terminal 41 by welding. The fuse portion 43 may be disposed in the inner side of the side wall 522 of the second insulator member 52 by being surrounded by the side wall 522.

Since the fuse portion 43 is disposed outside of the space of the rechargeable battery, set by the case 20 and the cap plate 30, stability of the rechargeable battery can be maintained when arc is generated after the fuse is operated, and freedom for a design can be improved.

The fuse portion 43 may be supported by the first and second insulator members 51 and 52 coupled to each other, and may be disposed in the first and second insulator members 51 and 52. Therefore, deterioration of the mechanical strength of the fuse portion 43 can be effectively prevented compared to the first and second plate terminals 41 and 42, and scattering of splinters due to the fuse operation can be prevented.

As described, when forming the electrode terminal 40, the first and second plate terminals 41 and 42 are separated from each other and then connected through the fuse portion 43, and therefore the second plate terminal 42 can maintain flatness even though the rivet terminal 44 is riveted to the first plate terminal 41.

Thus, when a battery pack is formed by arranging a plurality of rechargeable batteries adjacent to each other and the electrode terminals 40 are connected using a bus bar (not shown), a welding structure with the bus bar can be stably formed because the second plate terminal 42 maintains flatness.

Referring to FIGS. 2 to 5, the electrode terminal 40 may be provided in a terminal hole 35 of the cap plate 30 through the rivet terminal 44 including a gasket 47. The gasket 47 may seal the external surface of the rivet terminal 44 and the inner surface of the terminal hole 35.

The rivet terminal 44 may be connected to a lead tab 46 through a flange 45 inside of the case 20, e.g., below the cap plate 30. The flange 45 may be wider than the terminal hole 35 of the cap plate 30. The gasket 47 may extend further between the flange 45 and an inner surface of the cap plate 30 to further seal the flange 45 and the cap plate 30. That is, the gasket 47 may prevent leakage of the electrolyte solution through the terminal hole 35 by which the electrode terminal 40 is provided on the cap plate 30.

The lead tab 46 may electrically connect the electrode terminal 40 to the negative and positive electrodes 11 and 12 of the electrode assembly 10. That is, the lead tab 46 may be coupled to a lower end of the rivet terminal 44 and the lower end may be caulked such that the lead tab 46 is connected to the lower end of the rivet terminal 44 while being supported by the flange 45.

An internal insulator 53 may be provided between the lead tab 46 and the cap plate 30 for electrical insulation between the lead tab 46 and the cap plate 30. In addition, the internal insulator 53 may be coupled to the cap plate 30 at one side and may surround the lead tab 46 and the flange 45 and the rivet terminal 44 at another side for stabilization of the connection structure.

The second sub-module M2 may include the lead tab 46, the internal insulator 53, the gasket 47, and the rivet terminal 44. In the electrode terminal 40, the rivet terminal 44 may be coupled with the lead tab 46, the internal insulator 53, and the gasket 47 such that the second sub-module M2 can be arranged on the inner side of the cap plate 30. As shown in FIG. 5, an upper portion of the rivet terminal 44 may be riveted to the first plate terminal 41 by inserting the second sub-module M2 in the terminal hole 35 in a lower portion of the cap plate 30 and arranging the first sub-module M1 on an upper portion of the cap plate 30 such that assembling of the cap plate 30 and the electrode terminal 40 can be improved.

Hereinafter, another exemplary embodiment will be described, and descriptions of portions similar to or the same as those of the first exemplary embodiment will not be repeated and, in general, only portions that are different from those of the first exemplary embodiment will be described.

Figure 8:
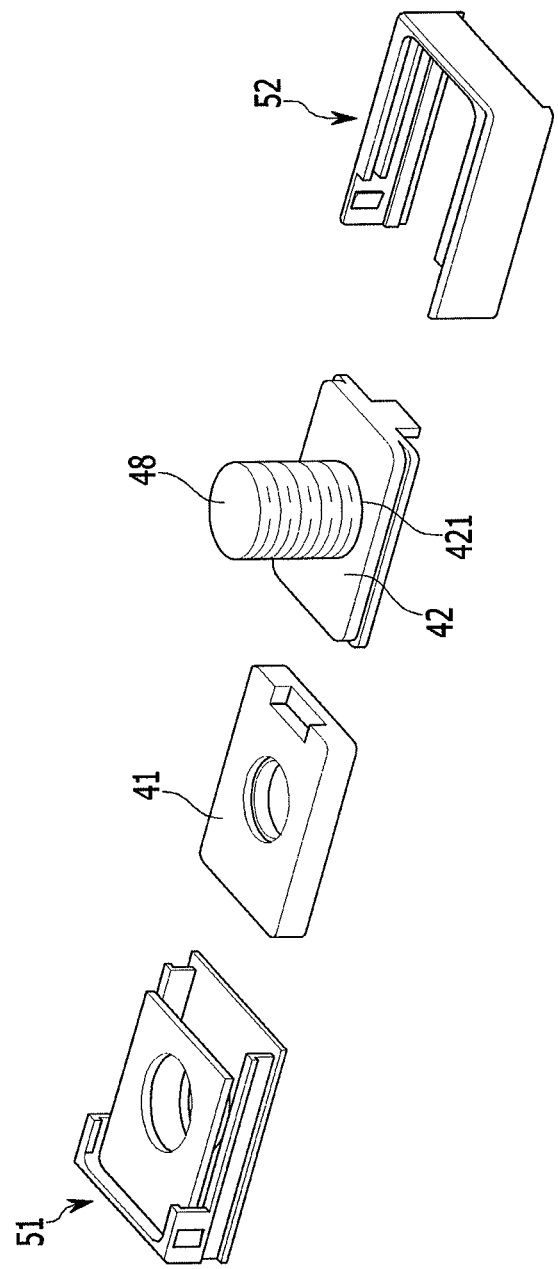
FIG. 8 illustrates an exploded perspective of an external insulator and an electrode terminal of a rechargeable battery according to a second exemplary embodiment.
Figure 9:
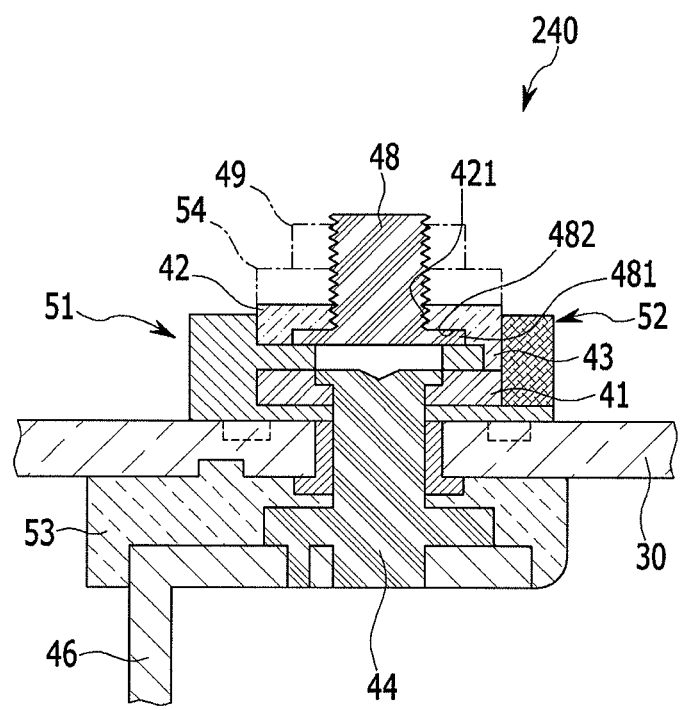
FIG. 9 illustrates an assembled cross-sectional view of FIG. 8.

FIG. 8 illustrates an exploded perspective view of an external insulator 50 and an electrode terminal 240 of a rechargeable battery according to a second exemplary embodiment, and FIG. 9 illustrates an assembly cross-sectional view of FIG. 8. Referring to FIG. 8 and FIG. 9, in the second exemplary embodiment, the external insulator 50 may include a first insulator member 51 and a second insulator member 52 that are the same as those of the first exemplary embodiment.

An electrode terminal 240 of the second exemplary embodiment includes the first plate terminal 41, the second plate terminal 42, the fuse portion 43, the rivet terminal 44, and a bolt 48. That is, the electrode terminal 240 of the second exemplary embodiment further includes the bolt 48 in addition of the electrode terminal 40 of the first exemplary embodiment.

The bolt 48 may be provided in a through-hole 421 of the second plate terminal 42 and may externally protrude from the second plate terminal 42. In such embodiments, a head 481 of the bolt 48 may be supported between the second plate terminal 42 and the first plate terminal 41 that may be arranged facing each other. The second plate terminal 42 forms a receiving groove 482 receiving the head 481. More particularly, the head 481 may be supported between the second plate terminal 42 and the first insulator member 51 and/or between the second plate terminal 42 and the second plate 512.

In such embodiments, a bus bar 54 can be installed by fastening a nut 49 to the bolt 48 while the bus bar 54 is provided in the second plate terminal 42 and the bolt 48. Compared to the first exemplary embodiment in which the bus bar is installed by welding, the bolt-nut fastening method of the second exemplary embodiment can further simplify installation of the bus bar 54.

<Description of symbols>

| | |
|---|---|
| 10: electrode assembly | 11: negative electrode |
| 11a, 12a: coated region | 11b, 12b: uncoated region |
| 12: positive electrode | 13: separator |
| 20: case | 30: cap plate |
| 31: electrolyte injection opening | 32: vent hole |
| 33: sealing cap | 34: vent plate |
| 35: terminal hole | 40: electrode terminal |
| 41, 42: first and second plate terminals | 43: fuse portion |
| 44: rivet terminal | 45: flange |
| 46: lead tab | 47: gasket |
| 48: bolt | 50: external insulator |
| 51, 52: first and second insulator member | 53: internal insulator |
| 54: bus bar | 240: electrode terminal |
| 411, 421: through-hole | 412: receiving groove |
| 422: opposed coupling frame | 481: head |
| 482: receiving groove | |
| 511, 512: first and second plates | |
| 513: side wall | 514: lower side wall |
| 515: upper side wall | 516: lower coupling groove |
| 517: upper coupling groove | 518: snap groove |
| 521: coupling protrusion | 522: side wall |
| 523: snap | 524: slide groove |
| D1, D2: diameter | |
| H1, H2: first and second through-holes | |
| M1, M2: first and second sub-modules | |

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A rechargeable battery, comprising:
an electrode assembly;
a case in which the electrode assembly is installed, the case including an opening;
a cap plate coupled to the opening of the case;
an electrode terminal provided on the cap plate; and
an external insulator receiving the electrode terminal from an external side of the cap plate,
wherein the electrode terminal includes:
a first plate terminal electrically connected to the electrode assembly,
a second plate terminal overlying and separated from the first plate terminal,
a fuse portion between and connecting the first plate terminal and the second plate terminal, and
a rivet terminal connecting the electrode assembly to the first plate terminal, and wherein the external insulator includes:
a first insulator member including first and second parallel plates, and a sidewall connecting the first and second parallel plates, the first parallel plate supporting the first plate terminal in an insulated manner, the second parallel plate supporting the second plate terminal in an insulated manner, the second parallel plate being between and separating the first and second plate terminals, and the sidewall surrounding at least one side of the first and second plate terminals, and
a second insulator member coupled to the first insulator member and surrounding at least one other side of the first and second plate terminals opposite the sidewall of the first insulator member, the fuse portion being between and directly contacting the second insulator member and the second parallel plate of the first insulator member.

2. The rechargeable battery as claimed in claim 1, wherein the sidewall connects side surfaces of the first and second parallel plates.

3. The rechargeable battery as claimed in claim 2, wherein the first parallel plate includes a first through-hole corresponding to a through-hole of the first plate terminal, the first through-hole receives the rivet terminal, and the second parallel plate includes a second through-hole corresponding to a through-hole of the second plate terminal and the first through-hole.

4. The rechargeable battery as claimed in claim 3, wherein a diameter of the second through-hole is larger than a diameter of the first through-hole.

5. The rechargeable battery as claimed in claim 2, wherein the sidewall of the first insulator member includes a lower sidewall surrounding the first plate terminal and an upper sidewall surrounding the second plate terminal.

6. The rechargeable battery as claimed in claim 5, wherein the lower sidewall includes a lower coupling groove to be coupled to a coupling protrusion of a sidewall of the second insulator member, arranged opposite to the lower coupling groove.

7. The rechargeable battery as claimed in claim 5, wherein the upper sidewall includes an upper coupling groove to be coupled to a coupling frame of the second plate terminal, arranged opposite to the upper coupling groove.

8. The rechargeable battery as claimed in claim 2, wherein the second insulator member includes a sidewall connected to the sidewall of the first insulator member to surround the at least one other side surface of the first and second parallel plates.

9. The rechargeable battery as claimed in claim 8, wherein the second insulator member includes a snap on an inner side of the sidewall so as to be coupled to a snap groove of the first insulator member, arranged opposite to the snap.

10. The rechargeable battery as claimed in claim 8, wherein the second insulator member includes a slide groove on an inner side of the sidewall so as to be coupled to a coupling frame of the second plate terminal, arranged opposite to the slide groove.

11. The rechargeable battery as claimed in claim 8, wherein the fuse portion protrudes downward from the second plate terminal and the fuse portion has a width that is smaller than a width of the second plate terminal, and is electrically connected to a receiving groove of the first plate terminal.

12. The rechargeable battery as claimed in claim 11, wherein the fuse portion is surrounded by the second insulator member and is disposed on an inner side of the sidewall.

13. The rechargeable battery as claimed in claim 2, wherein the electrode terminal further includes a bolt provided in a through-hole of the second plate terminal.

14. The rechargeable battery as claimed in claim 13, wherein a head of the bolt is supported between the second plate terminal and the second parallel plate that face each other.

15. The rechargeable battery as claimed in claim 13, wherein a head of the bolt is supported between the second plate terminal and the first plate terminal.

16. The rechargeable battery as claimed in claim 13, wherein a head of the bolt is supported between the second plate terminal and the first insulator member.

17. A rechargeable battery, comprising:
an electrode assembly;
a case in which the electrode assembly is installed, the case including an opening;
a cap plate coupled to the opening of the case;
an electrode terminal including a first sub-module and a second sub-module, wherein:
the first sub-module is arranged on a first side of the cap plate, and the second sub-module is arranged on an second side of the cap plate,
the first sub-module includes:
a first plate terminal electrically connected to the electrode assembly,
a second plate terminal overlying and separated from the first plate terminal,
a fuse portion between and connecting the first plate terminal and the second plate terminal,
a rivet terminal connecting the electrode assembly to the first plate terminal, and
an external insulator supporting and electrically insulating the first plate terminal and the second plate terminal, wherein the external insulator includes:
a first insulator member including first and second parallel plates, and a sidewall connecting the first and second parallel plates, the first parallel plate supporting the first plate terminal in an insulated manner, and the second parallel plate supporting the second plate terminal in an insulated manner, the second parallel plate between and separating the first and second plate terminals, and the sidewall surrounding at least one side of the first and second plate terminals, and
a second insulator member coupled to the first insulator member and surrounding at least one other side of the first and second plate terminals opposite the sidewall of the first insulator member, the fuse portion being between and directly contacting the second insulator member and the second parallel plate of the first insulator member.

18. The rechargeable battery as claimed in claim 17, wherein the first side is an external side and the second side is an internal side of the case.

19. The rechargeable battery as claimed in claim 17, wherein the second insulator member directly contacts the at least one other side of the first and second plate terminals opposite the sidewall of the first insulator member.

20. The rechargeable battery as claimed in claim 1, wherein the second insulator member directly contacts the at least one other side of the first and second plate terminals opposite the sidewall of the first insulator member.

* * * * *